(No Model.)

F. BREMERMAN.
TURNING GEAR FOR WAGONS.

No. 263,016. Patented Aug. 22, 1882.

WITNESSES.
Jacob W. Looper
F. J. Richardson

INVENTOR.
Fredrick Bremerman
By C. P. Jacobs, Atty.

UNITED STATES PATENT OFFICE.

FREDRICK BREMERMAN, OF INDIANAPOLIS, INDIANA.

TURNING-GEAR FOR WAGONS.

SPECIFICATION forming part of Letters Patent No. 263,016, dated August 22, 1882.

Application filed June 29, 1882. (No model.)

*To all whom it may concern:*

Be it known that I, FREDRICK BREMERMAN, of Indianapolis, Indiana, have invented a new and useful Improvement in Safety Turning-Gear for Carriages and Wagons, of which the following is a description, reference being had to the accompanying drawings, in the several figures of which like letters indicate like parts.

My invention is intended to prevent the catching or cramping of the forward wheel in the side of the box when the carriage is turning round, and for this purpose I employ two parallel rods, B and B', which are attached to the forward axle by means of saddle-clips or any other similar device, and have threaded bolts on the ends, which are secured by nuts C. These nuts have heads with socket attached, which allow lateral play as the carriage is turned either way. Attached to the ends of the rods B B' is a metallic belt or spring, A, which passes around the inner circle or fifth-wheel of the block D, which is secured to the under side of the hind axle. E E' are blocks or brakes, adjustable upon the belt or band at any point and secured in place by set-screws.

Figure 1:
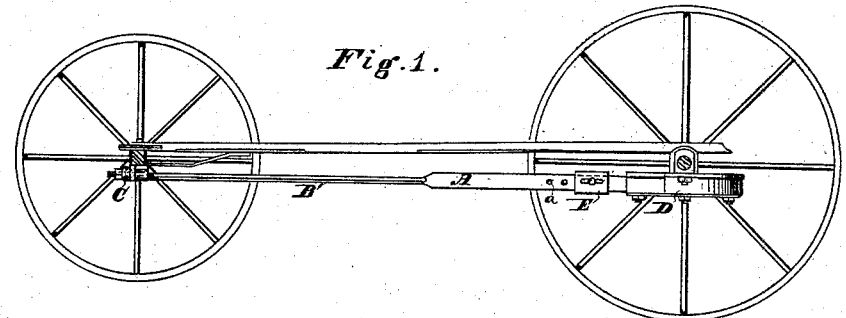
Figure 2:
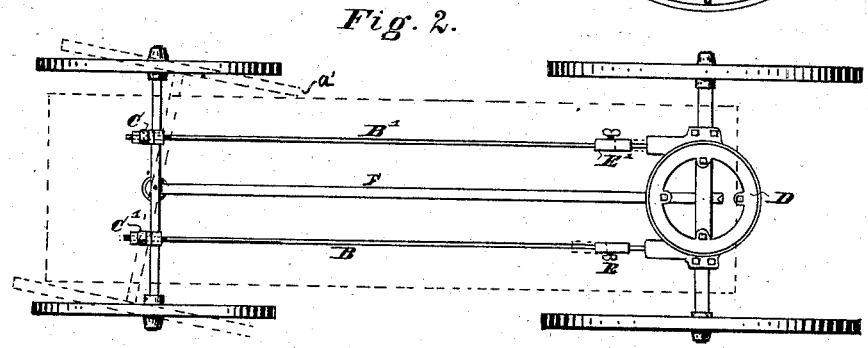
Figure 3:
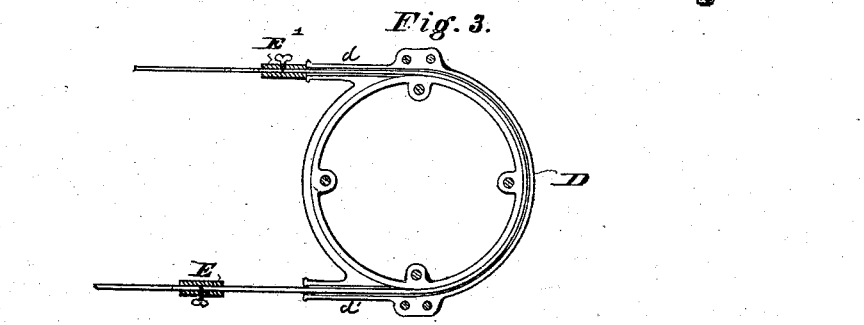

In the drawings, Figure 1 represents a side view of my device, two wheels being removed, and showing a cross-section of the front and rear axles. Fig. 2 is a top view. The rectangular dotted line shows the extreme points on either side to which the wheel would come when turned, as indicated by the other dotted lines. Fig. 3 is a plan showing the block E' abutting against an arm, d, of the block D, and thus preventing the further movement of the wheel inward, and E shows the position of the block on the opposite side.

My device operates as follows: If the horse be turned to the right, the right-hand forward wheel is turned to the position shown in the dotted line, Fig. 2, at a', and the block E' is moved up against the arm d, as shown in Fig. 3, and is prevented from going farther. By the same movement the block E moves toward the front left-hand wheel, the band A moving around the inner wheel of the block D. To prevent friction I put a loose metallic washer around the periphery of the inner wheel of the block, and the band A moves more freely upon it than if no such washer were used. The band is held in place by a bar or plate passing across the under side of the fifth-wheel D and secured to either side by bolts. Places for attaching such a bar or plate are shown in Fig. 3.

F is an ordinary reach or coupling-bar for uniting the two parts of the carriage, and having the ordinary fifth-wheel, F'.

What I claim, and desire to secure by Letters Patent, is—

1. In combination with the wheels, axles, and reach of a wagon or carriage, the parallel bars B B' and adjustable stops E E' upon a band, A, attached to the rear end of such bars, passing around a circular disk in the center of the block D, attached to the rear axle, substantially as described.

2. In coupling-gears for carriages and wagons, parallel rods on either side, attached to the front axle in such a manner as to allow a lateral movement, and connected with a band or belt which passes round a circular disk attached to the rear axle, with stops adjustable thereon for limiting the movement of the forward wheels toward the body of the vehicle, substantially as described.

In witness whereof I have hereunto set my hand this 26th day of June, 1882.

F. BREMERMAN.

Witnesses:
C. P. JACOBS,
B. A. RICHARDSON.